United States Patent [19]
Walsh et al.

[11] Patent Number: 5,687,009
[45] Date of Patent: Nov. 11, 1997

[54] DEVICE AND METHOD FOR MAINTAINING IMAGE SCANNER DATA OUTPUT RATE WITHOUT REGARD TO SCANLINE LENGTH WHILE MAINTAINING A CONSTANT INTEGRATION TIME

[75] Inventors: John F. Walsh; James W. Stevens, both of Rochester, N.Y.

[73] Assignee: Xerox Corporation, Stamford, Conn.

[21] Appl. No.: 535,440

[22] Filed: Sep. 28, 1995

[51] Int. Cl.⁶ .................................................. H04N 1/04
[52] U.S. Cl. ........................ 358/486; 382/317; 382/319
[58] Field of Search .................................. 358/474, 482, 358/483, 486, 487, 493, 494, 496, 497; 382/312, 313, 317, 319; 348/295, 297; 250/200, 201.1, 206, 208.1

[56] References Cited

U.S. PATENT DOCUMENTS

| | | | |
|---|---|---|---|
| 4,541,061 | 9/1985 | Schoon | 364/518 |
| 4,587,415 | 5/1986 | Tsunekawa et al. | 250/204 |
| 4,628,368 | 12/1986 | Kurata et al. | 358/293 |
| 4,878,119 | 10/1989 | Beikirch et al. | 358/471 |
| 5,043,827 | 8/1991 | Beikirch | 358/471 |

Primary Examiner—Thomas D. Lee
Assistant Examiner—Jerome Grant, III
Attorney, Agent, or Firm—Michael J. Nickerson

[57] ABSTRACT

A method for varying a scanline rate of a digital scanner while maintaining a constant integration period. The scanner scans a scanline of an image, integrates an array of photosensors after a first predetermined period of time has elapsed and after a second predetermined period of time has elapsed. One of the predetermined periods is equal to an integration period of the array of photosensors, and the other period is equal to a difference between a time needed to process a scanline of image data and the integration period of the array of photosensors. The scanner produces a scanline of valid image data and a scanline of image data corresponding to the first scanned scanline. The scanner then scans the next scanline of the image. By having a variable dummy or garbage integration period in conjunction with the analog image unit's constant rated integration period to form the scanline period, a scanner can utilize a variable scanline period while maintaining a constant integration period and a synchronous scanning operation so as to capitalize on the increase efficiency of new photosensors and faster microprocessors and other processing circuitry.

13 Claims, 3 Drawing Sheets

DEVICE AND METHOD FOR MAINTAINING IMAGE SCANNER DATA OUTPUT RATE WITHOUT REGARD TO SCANLINE LENGTH WHILE MAINTAINING A CONSTANT INTEGRATION TIME

FIELD OF THE PRESENT INVENTION

The present invention is directed to a device or method for varying the scanline rate while maintaining the analog imaging unit's integration time. More, specifically, the present invention is directed to varying the scanline time period while maintaining a constant analog imaging unit's integration time period through the utilization of a dummy or garbage integration time period.

BACKGROUND OF THE PRESENT INVENTION

Raster input scanners typically employ one or more arrays of photosensitive cells such as CCDs for scanning. The arrays convert each scanned image line into a series of charges which, following suitable processing, are output as image signals or pixels to an end user. The scanning array, for example, may be carried on a carriage which traverses back and forth under a platen to provide the necessary relative motion between the image and the array. Other arrangements such as a half rate/full rate system of mirrors and lamp(s) which reflect the image into a stationary array, a lamp scanning array with a movable document, etc., may also be utilized. An optical system focuses the reflected image onto the array, and one or more lamps provide illumination of the image.

In a conventional scanning process, the image area viewed by each array of photosensors is converted into a charge potential represented of the image's grey level. Conventional scanning takes place during an integration period of a preset duration which is determined by lens F-stop, light intensity, etc. Following integration, the image charges are transferred to a pair of analog shift registers, the operating sequence being such that during the integration period, the image charges (image data) from a previous scanline are clocked from the shift registers leaving the shift registers free to receive the image charges from the next integration. The duration of the integration period, which must be sufficiently long enough to fully integrate the image line being scanned, yet not so long as to allow the array of photosensors to become saturated, is measured by a periodic fix rate clock signal or shift pulses.

When the conventional scanner operates in a synchronized manner, relative scanning movement between the array and images are at a fixed rate. This in turn permits timing of the shift pulses in the signal requesting the next line of image signals, referred to as the integration signals, to be synchronized with one another.

However, when a scanner operates asynchronously; i.e., when the image data generation rate of the image input terminal is faster than the data processing rate of the device receiving the image data; the relative scanning movement between the array and image is not fixed, but random and changes with demand. In other words, the signals are produced in response to the movement of the array or document. As a result, the timing of the integration signal can vary and not be in sync with the fixed rate shift pulses. This can reduce the integration period, resulting in an incomplete integration of the image line being scanned.

Many methods and devices have been developed which provide asynchronous transfer when there is a difference in the transfer rate between the sending and receiving devices and also address the incomplete integration problem. These various approaches will be briefly discussed below.

U.S. Pat. No. 4,541,061 to Schoon discloses an approach wherein the operating clock signal of a scanning apparatus is provided at a rate that matches the varying velocity of the scanning mirror through the use of a memory in which the various clock rates are stored based on the known repetitive movement of the mirror. The entire contents of U.S. Pat. No. 4,541,061 are hereby incorporated by reference.

Another approach has been proposed in U.S. Pat. No. 4,587,415 to Tsunekawa et al. This U.S. patent discloses a photodetector with a timing control unit for controlling the information storage and information read out process of the detector. The entire contents of U.S. Pat. No. 4,587,415 are hereby incorporated by reference.

Moreover, U.S. Pat. No. 4,628,368 to Kurata et al. discloses a system for controlling the scanning rate of a document reader in which the speed, acceleration, and the deceleration of the reader are set according to image information stored in a buffer memory. The entire contents of U.S. Pat. No. 4,628,368 are hereby incorporated by reference.

U.S. Pat. No. 5,043,827 to Beikirch discloses a scanning system which corrects for incomplete integration. This scanning system utilizes an interpolator to provide a composite line of image signals when an integration period is prematurely terminated. The entire contents of U.S. Pat. No. 5,043,827 are hereby incorporated by reference.

Furthermore, U.S. Pat. No. 4,878,119 to Beikirch et al. discloses a process for operating a scanning array asynchronously. The array has at least one row of sensors for scanning an image viewed by the array during an integration period and a shift register for receiving the signal charges developed by the sensor following the integration period. This process includes periodically generating, at a constant clock rate, integration pulses defining a succession of predetermined integration intervals and generating a start integration signal in response to a demand for a line of image signals where the time at which the start integration signal occurs is different than the time at which the integration pulses occur. The process interrupts the current integration interval in response to a start integration signal to commence a new integration interval to provide the asynchronous transfer of a line of image signals. The entire contents of U.S. Pat. No. 4,878,119 are hereby incorporated by reference.

By utilizing an asynchronous stop/start scanning system, the optical system or documents are slowed down or stopped completely until an output buffer in the image input terminal is emptied enough to resume scanning. The video data timing is not synchronous to a fixed clock, but is dependent upon the motion control system. This involves a more complex control system and has motion and image quality issues associated therewith.

Because a synchronous scanner operates so that the relative scanning movement between the array and images are fixed, the synchronous scanner cannot optimize its scanning speed when scanning documents that are less than the full platen image area. More specifically, synchronous scanners experience relatively long inactive periods at the end of each scanline when scanning an image involving less than full platen (in the fast-scan direction) image areas. To eliminate this inefficiency when scanning an image involving less than the full platen image area, it has been proposed to utilize an asynchronous scanning operation wherein the integration periods are random and variable; however, as noted above asynchronous systems present their own problems.

To eliminate the relative inefficiencies of the conventional synchronous scanning process and to avoid the various problems associated with an asynchronous process, the present invention employs the utilization of a varying scanline rate while maintaining the analog imaging unit's integration time. More specifically, the present invention proposes clocking the image data out of the CCD sensors twice per scanline. In other words, the present invention contemplates a process of generating a throw away line at a variable interval followed by a good line of image data at the proper integration time wherein this process is repeated for the entire length of the image page.

SUMMARY OF THE PRESENT INVENTION

One aspect of the present invention is a method for varying a scanline rate of a digital scanner while maintaining a constant integration period. The method scans a scanline of an image, integrates an array of photosensors after a first predetermined period of time and after a second predetermined period of time have elapsed, one predetermined period of time being equal to an integration period of the array of photosensors and the other predetermined period of time being equal to a difference between a time needed to process a scanline of image data and the integration period of the array of photosensors, and produces a scanline of valid image data and a scanline of image data corresponding to the scanned scanline from the two integration periods.

Another aspect of the present invention is a system which varies a scanline rate of a digital scanner while maintaining a constant integration period. In this system photosensitive means converts the light reflected from a first scanline of an image into image signals, and controller means produces integration signals to control an integration of the photosensitive means. The controller means produces a first integration signal after a first predetermined period has elapsed and a second integration signal after a second predetermined period has elapsed. One of the predetermined periods of time is equal to an integration period of the array of photosensors and the other predetermined period of time is equal to a difference between a time needed to process a scanline of image data and the integration period of the array of photosensors. The photosensitive means produces a first scanline of valid image data and produces a second scanline of image data in response to the integration signals.

Further advantages of the present invention will become apparent from the following description of the various features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
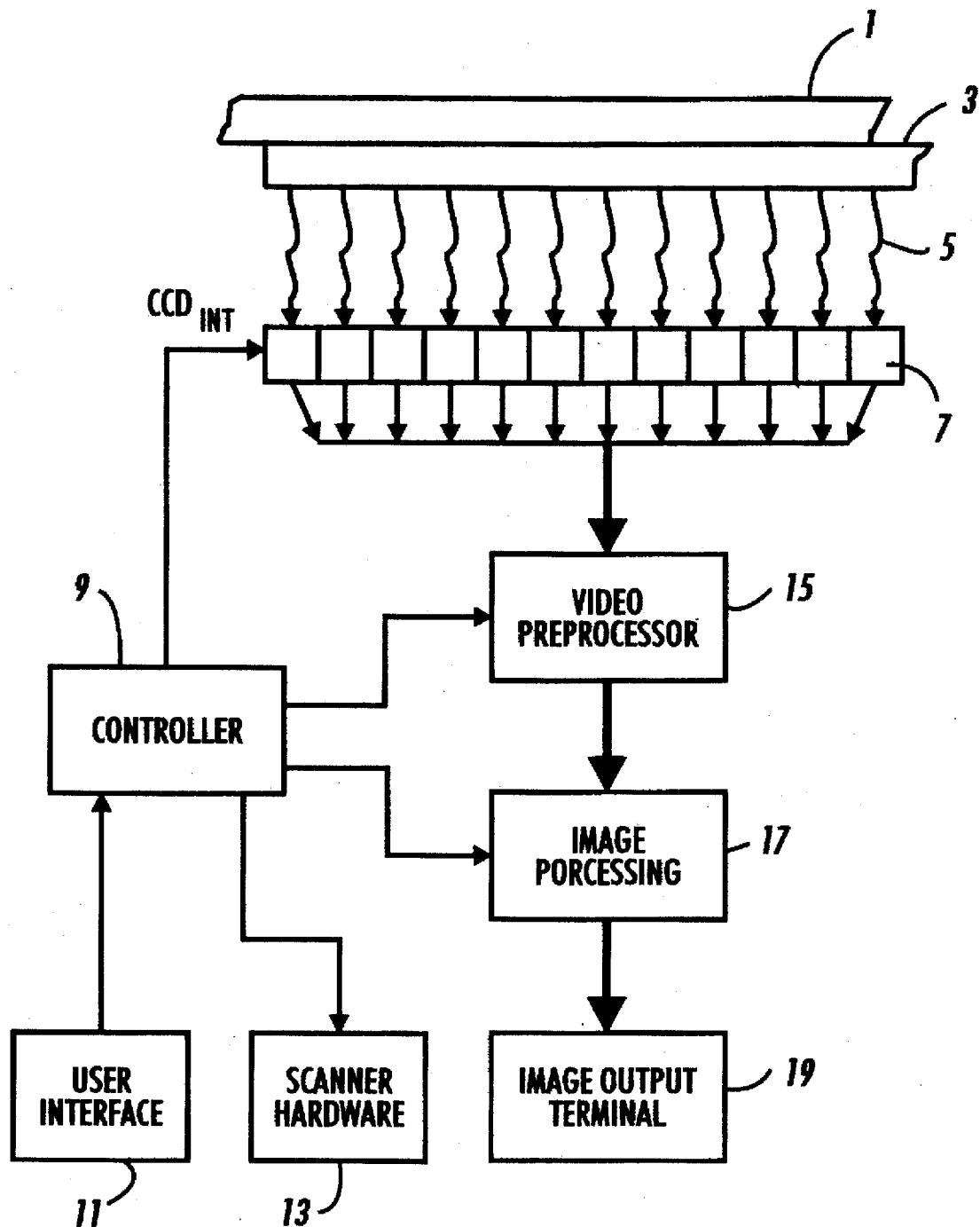
FIG. 1 is a block diagram illustrating the architecture of one embodiment of the present invention.

The following is a detailed description of the drawings illustrating the present invention. In this description, as well as in the drawings, like reference numerals represent devices, circuits, or equivalent circuits which perform the same or equivalent functions.

FIG. 1 illustrates an example of the architecture of a synchronous scanner which is capable of carrying out the concepts of the present invention. It is noted that the present invention is not limited to the below described architecture but can be implemented in any synchronous scanner. The invention can also be implemented in a scanner which either scans a document wholly placed on a platen or scans a document as the document is fed past the scanning device.

As illustrated in FIG. 1, a document 1 having an image thereon is placed upon a glass platen 3. During the scanning process, light reflecting from the document 1 through the glass platen 3 impinges upon, usually through a lens system (not shown), the photosensors 7. The photosensor 7 may be arranged in a CCD sensor or as a full width array. The photosensors 7 convert the light energy into an electrical charge which is transferred to a video preprocessor 15 upon the receipt of a CCD integration signal from a controller 9.

From the video preprocessor 15 which has converted the signals to digital signal and corrected for offset and gain drift, the image data is transferred to an image processing section 17 which carries out the necessary image processing operations upon the image data in preparing the image data for transferring to an image output terminal 19. The image output terminal 19 may be a printing device, display device, a network, a storage device, or other device which is capable of receiving the image data.

The controller 9 is also connected to the video preprocessor 15 and image processing circuit 17 so as to control the various functions carried out by these circuits according to information received by the controller about the contents of the image and the image type. This information may be conveyed to the controller 9 through a user interface 11 or through conventional image segmentation processors.

Also, the controller 9 controls scanner hardware 13 associated with the synchronous scanner so as to control the relative movement between the photosensors 7 and the image document 1.

The present invention, as described above, varies a scanline rate of a digital scanner while maintaining a constant integration period. In this system the photosensitive device 7, such as a full width array or CCD sensor, converts the light reflected from a first scanline of an image into image signals, and the controller 9 produces integration signals to control an integration of the photosensitive device 7. The controller 9 produces a first integration signal after a first predetermined period has elapsed and a second integration signal after a second predetermined period has elapsed. One of the predetermined periods of time is equal to an integration period of the array of photosensors and the other predetermined period of time is equal to a difference between a time needed to process a scanline of image data and the integration period of the array of photosensors. The photosensitive device produces one scan line of valid image data and one scan line of invalid image data in response to the integration signals from the controller 9.

In one embodiment of the present invention, the first predetermined period of time is equal to an integration period of the array of photosensors and the second predetermined period of time being equal to a difference between a time needed to process a scanline of image data and the integration period of the array of photosensors. In another embodiment of the present invention, the second predetermined period of time is equal to an integration period of the array of photosensors and the first predetermined period of time being equal to a difference between a time needed to process a scanline of image data and the integration period of the array of photosensors.

The integration periods and scanline period can be established by the controller 9 in many different ways. For example, the controller 9 will have the integration period of the photosensitive device 7 stored in a memory because this time period can be predetermined from the design of the scanning system. The dummy integration period and the total scanline period are established by the controller 9 for each scan of a document. In other words, once the controller 9 knows the processing time for one scanline of the image (fast-scan direction), the scanline period can be calculated and the dummy integration period be set. Thus, the controller 9 needs to determine this processing speed which is dependent upon the image type, resolution in the fast-scan direction, the fast-scan direction length of the image, etc.

To determine the fast-scan direction length, the present invention can measure the location of registration guides on a document handler which will be placed a distance apart that is equal to the width of the document (fast-scan direction length). The present invention may also utilize a pre-scan of the document to determine the fast-scan direction length.

To determine the fast-scan resolution, the present invention may have this information already pre-stored depending on the design of the scanner, or the present invention may rely on a user, through the user interface 11 to input the fast-scan resolution.

To determine the image type, the present invention may rely on a image segmentation circuit connected to the controller 9 or a user inputting the image type through the user interface 11.

Figure 2:
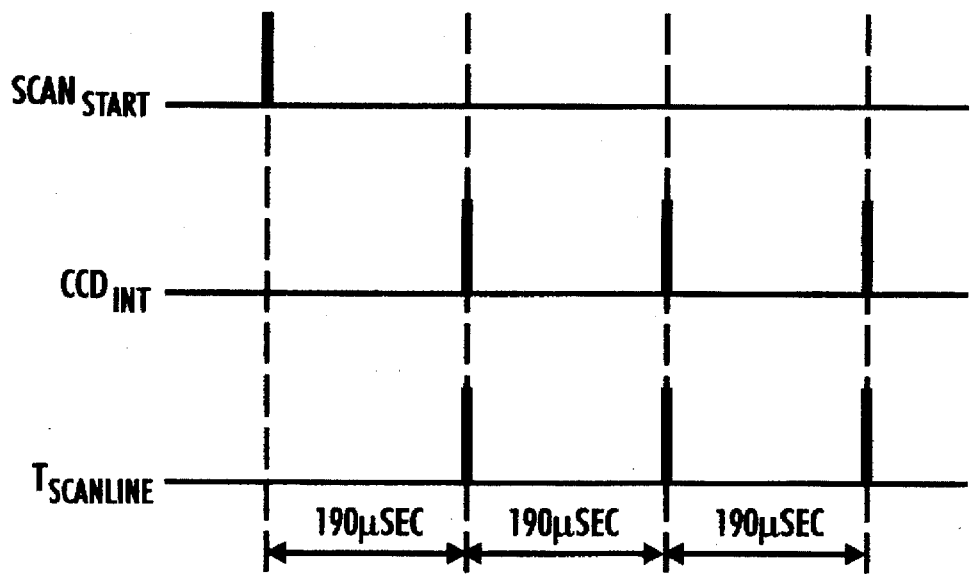
FIG. 2 is a timing diagram illustrating the operational sequence of a conventional synchronous scanner.

FIG. 2 illustrates the timing diagram for the synchronous operations of a conventional synchronous scanner. As discussed above, a conventional synchronous scanner has a CCD integration period which is dependent upon many factors. For example, a conventional scanner may have an integration period of 190 microseconds.

Since this integration period is longer than the time needed to digitally process the image data, the time period for the scanline $T_{scanline}$ is also 190 microseconds. In operation, the conventional synchronous scanner initially generates a scan signal which begins the scanning process. One hundred ninety (190) microseconds later, the conventional synchronous scanner produces a $CCD_{INT}$ (integration time) signal and a $T_{scanline}$ signal which causes the photosensors to transfer the electronic charges built up therein to the video preprocessor. The $CCD_{INT}$ signal may or may not also trigger the required motion between the photosensors and the input document. In the conventional synchronous scanner, the scanline period and CCD integration period remain the same notwithstanding the speed of the digital image processing system or the actual length of the scanline in the fast-scan direction.

As discussed above, the conventional image scanner outputs lines of image data at a set frequency. The line period is equal to the integration time of the analog imaging device. As a result of this, scan times for images are determined solely by the slow-scan image length. It is therefore, a desire to feed documents from a document handler onto a platen in the orientation such that the slow-scan length of the document is minimized when utilizing a conventional scanner. For example, an 8.5×11 in. document should be fed such that the 8.5 inch direction is the slow-scan direction. This preferred feeding orientation can be a burden to the entire system design. The present invention makes the scan time of an image equally dependent on both fast-scan and slow-scan lengths. The present invention, therefore, removes the preference on feeding orientation allowing the system designer to optimize the system based on other characteristics.

As noted before, it is desirable to maintain a synchronous system when scanning an image. Thus, even though scanners can have integration periods as small or smaller than 50 microseconds, these systems have not been readily implemented into a synchronous system because the conventional synchronous systems have been designed with a longer scanline period, such as 190 microseconds, to ensure complete scanning of all sizes of documents in the fast-scan direction.

Figure 3:
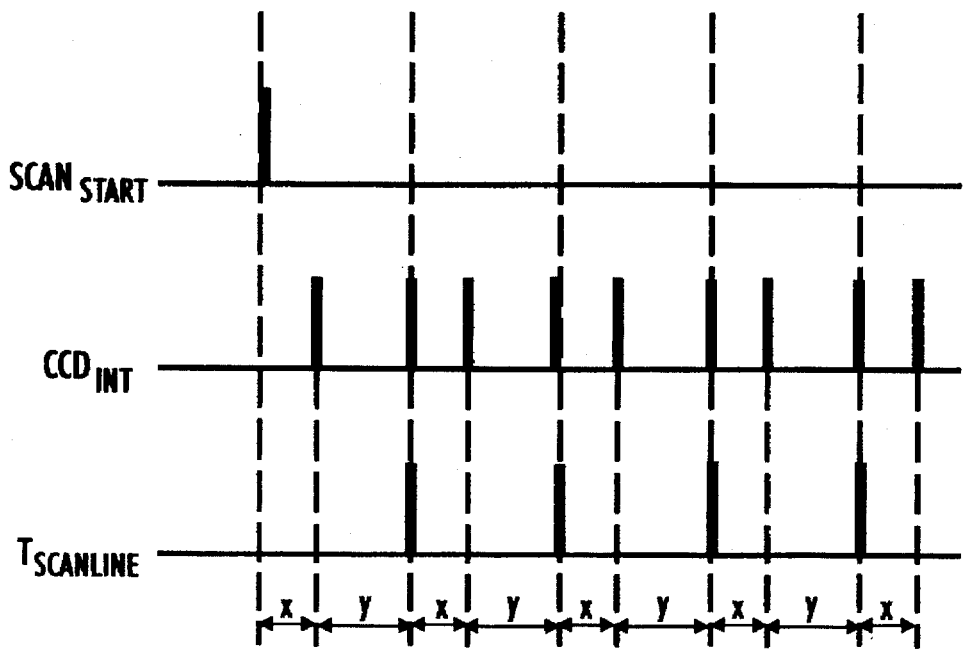
FIG. 3 is a timing diagram illustrating the operational sequence of a synchronous scanner utilizing the concepts of the present invention.

FIG. 3 illustrates a timing diagram for a synchronous scanner utilizing the concepts of the present invention. As shown in FIG. 3, the synchronous scanner, as with the conventional synchronous scanner, produces a scan signal to begin the scanning process. After the creation of the scan signal, the synchronous scanner of the present invention generates a $CCD_{INT}$ signal at a fixed interval thereafter.

Figure 4:
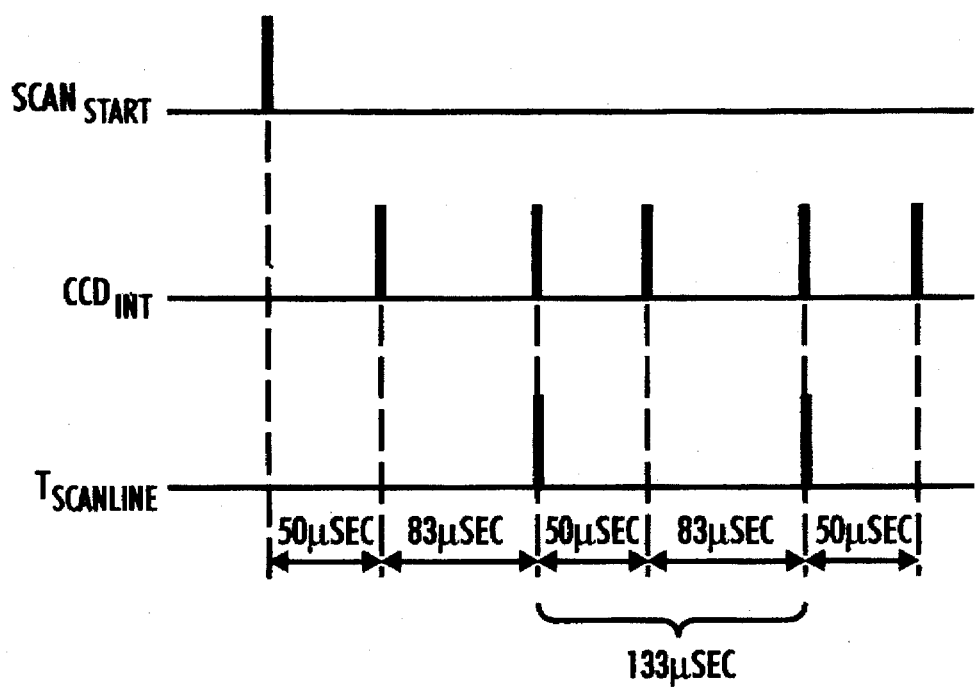
FIG. 4 is a timing diagram illustrating one example of the operational sequence of synchronous scanner utilizing the concepts of the present invention.
Figure 5:
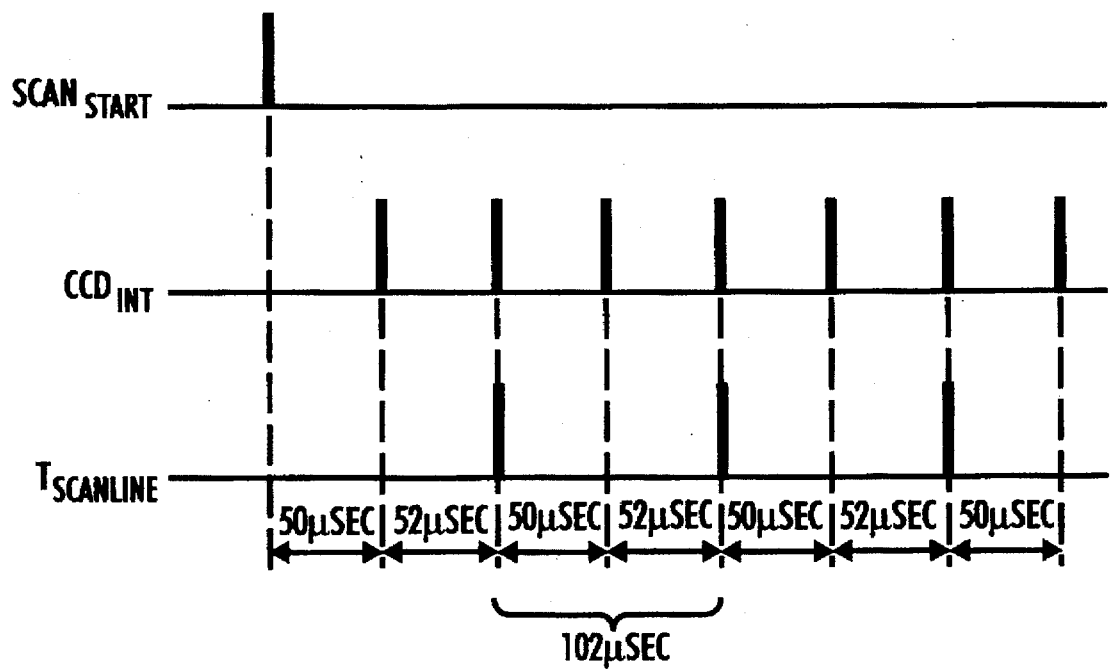
FIG. 5 is a timing diagram illustrating another example of the operational sequence of a synchronous scanner utilizing the concepts of the present invention.

For example, if the scanner is utilizing a photosensor system which is designed to have a photosensor integration time of X microseconds, the $CCD_{INT}$ signal would be produced X microseconds after the $scan_{START}$ signal is generated. After the initial $CCD_{INT}$ signal is generated, a second $CCD_{INT}$ signal is generated at an interval Y dependent upon the actual size, in the fast-scan direction, of the image document being scanned. Thus, if the size, in the fast-scan direction, of the image document being scanned is 8.5 inches, the interval Y between the first and second $CCD_{INT}$ signals would be shorter than if the size, in the fast-scan direction, of the image document being scanned was 11 inches. It is the fast-scan direction's length which determines the speed of the image processing operations; i.e., the throughput rate of the image processing module. FIGS. 4 and 5 illustrate specific examples which will be discussed in more detail below.

With the generation of the second $CCD_{INT}$ signal (at interval X+Y), the synchronous scanner of the present invention generates a $T_{scanline}$ signal. In other words, the present invention generates two $CCD_{INT}$ signals per scanline or generates two $CCD_{INT}$ signals per generation of a single $T_{scanline}$ signal. The time period (X+Y) for a scanline period ($T_{scanline}$) is equal to the time needed by the digital image processing system to properly process a single scanline of image data. Thus, the synchronous scanner of the present invention produces two $CCD_{INT}$ signals wherein the time period X of the first $CCD_{INT}$ signal is equal to the actual integration time for the particularly designed photosensors and the second $CCD_{INT}$ time period Y is equal to the difference between the $T_{scanline}$ time period and the first $CCD_{INT}$ time period. In other words, this second $CCD_{INT}$ time period Y is variable depending upon the actual length in the fast-scan direction of the document being scanned because the fast-scan direction dictates how much data is being fed to the image processing system per scanline which in turn dictates the speed of the image processing system.

For example, if the image processing can operate at 100 MHz (100,000,000 pixels per second) and the 8.5 inch scanline produces 15,300 pixels (1800 spot per inch (spi) resolution); the image processing system will be able to process this scanline in 153 microseconds. On the other hand, if the image processing can operate at 100 MHz and the 11 inch scanline produces 19,800 pixels (1800 spi resolution), the image processing system will be able to process this scanline in 198 microseconds. Moreover, if the image processing can operate at 50 MHz (50,000,000 pixels per second) and the 8.5 inch scanline produces 5,100 pixels (600 spi resolution); the image processing system will be able to process this scanline in 102 microseconds. Lastly, if the image processing can operate at 50 MHz and the 11 inch scanline produces 6,600 pixels (600 spi resolution), the image processing system will be able to process this scanline in 132 microseconds. Thus, the fast-scan direction's length will dictate the speed that an image processing system can process a scanline.

FIG. 4 illustrates a timing diagram showing the operational sequence of a synchronous scanner utilizing the concepts of the present invention when scanning an image document which is 11 inches in length in the fast-scan direction. Assuming that the integration period of the CCD for the particularly designed synchronous scanner is 50 microseconds (this is the time period which corresponds to the time needed by the photosites to be properly affected by the light reflected by the image to generate valid image data corresponding to the actual image being scanned), to calculate the time period needed to process digitally a scanline of image data for an image document which is 11 inches in the fast-scan direction, the scanline period is equal to the number of pixels in the fast-scan direction needed to scan that image document divided by the throughput speed of the digital image processing system plus some small necessary inter scanline time period ($T_{il}$). In this example, it is assumed that the small necessary inter scanline time period ($T_{il}$) is one microsecond.

Using the example illustrated in FIG. 4, the $T_{scanline}$ value is calculated for an image document that is 11 inches in the fast-scan direction and is being scanned at 600 spots per inch and processed by an image processing system capable of processing 50 bytes or 50 pixels of image data per microsecond wherein $T_{scanline}$ is equal to the fast-scan length multiplied by the resolution divided by the image processing throughput rate plus the inter scanline period. Thus, calculating $T_{scanline}$ for such a situation, $T_{scanline}=(11\times600)/50+T_{il}=132+T_{il}$ microseconds. As noted above, the necessary inter scanline times $T_{il}$ is one microsecond. Thus, a synchronous scanner, utilizing the concepts of the present invention when scanning an image document having a length of 11 inches in the fast-scan direction, can scan the document utilizing a scanline ($T_{scanline}$) period of 133 microseconds.

In other words, by using a system having two integration periods of 50 microseconds and 83 microseconds such that the second integration period is variable and dependent upon the throughput rate of the image processing system and contrasting this with a conventional synchronous scanners having a set or fixed scanline period of 190 microseconds, the present invention is capable of reducing the scanline period ($T_{scanline}$) of a scanner by almost 30 percent and retain its synchronous operations.

The present invention utilizes a first integration period equal to the integration characteristics of the photosensor and a second integration period as a dummy period to optimize the throughput of the scanner, while maintaining a synchronous operation.

To convert the scanline period value into a throughput value (scans or copies per minute), the throughput value is equal to 60 seconds divided by a value $T_{image\ scanned}$. $T_{image\ scanned}$ is equal to the scanline period ($T_{scanline}$) multiplied by the number of scanlines in the slow-scan direction plus an interscan period ($T_{interscan}$). In this example, it is assumed that $T_{interscan}=0.686$ seconds.

An image scan period ($T_{image\ scan}$) for a conventional synchronous scanner is equal to 190 microseconds×600 lines per inch×8.5 inches+0.686 seconds which is equal to 1.66 seconds. Thus, the conventional synchronous scanner has a throughput of 36 scans or documents per minute. On the other hand, if the scanline period of 133 microseconds is converted to a true throughput value, the synchronous scanner utilizing the concepts of the present invention can increase its throughput to 44 scans or documents per minute. This is approximately a 22 percent increase in production.

Using the example illustrated in FIG. 5, the $T_{scanline}$ value is calculated for an image document that is 8.5 inches in the fast-scan direction and is being scanned at 600 spots per inch and processed by an image processing system capable of processing 50 bytes or 50 pixels of image data per microsecond wherein $T_{scanline}$ is equal to the fast-scan length multiplied by the resolution divided by the image processing throughput rate plus the inter scanline period. Thus, calculating $T_{scanline}$ for such a situation, $T_{scanline}=(8.5\times600)/50+T_{il}=102+T_{il}$ microseconds. As noted above, the necessary inter scanline times $T_{il}$ is one microsecond. Thus, a synchronous scanner, utilizing the concepts of the present invention when scanning an image document having a length of 8.5 inches in the fast-scan direction, can scan the document utilizing a scanline period of 103 microseconds.

In other words, by using a system having two integration periods of 50 microseconds and 53 microseconds such that the second integration period is variable and dependent upon the throughput rate of the image processing system and contrasting this with a conventional synchronous scanners having a set or fixed scanline period of 190 microseconds, the present invention is capable of reducing the scanline period ($T_{scanline}$) of a scanner by almost 46 percent and retain its synchronous operations.

The present invention utilizes a first integration period equal to the integration characteristics of the photosensor and a second integration period as a dummy period to optimize the throughput of the scanner, while maintaining a synchronous operation.

To convert the scanline period value into a throughput value (scans or copies per minute), the throughput value is equal to 60 seconds divided by a value $T_{image\ scanned}$. $T_{image\ scanned}$ is equal to the scanline period ($T_{scanline}$)×the number of scanlines in the slow-scan direction+an interscan period ($T_{interscan}$). As noted before, in this example, it is assumed that $T_{interscan}=0.686$ seconds.

An image scan period ($T_{image\ scan}$) for a conventional synchronous scanner is equal to 190 microseconds×600 lines per inch×11 inches+0.686 seconds which is equal to 1.94 seconds. Thus, the conventional synchronous scanner has a throughput of 31 scans or documents per minute. On the other hand, if the scanline period of 103 microseconds is converted to a true throughput value, the synchronous scanner, utilizing the concepts of the present invention, can increase its throughput to 44 scans or documents per minute. This is approximately a 42 percent increase in production.

In another example, it is assumed that the integration period of the CCD for the particularly designed synchronous scanner is 100 microseconds (this is the time period which corresponds to the time needed by the photosites to be properly affected by the light reflected by the image to generate valid image data corresponding to the actual image being scanned). Using the process discussed above, the $T_{scanline}$ value is calculated for an image document that is 11 inches in the fast-scan direction and is being scanned at 600 spots per inch and processed by an image processing system capable of processing 50 bytes or 50 pixels of image data per microsecond, $T_{scanline}=(11\times600)/50+T_{it}=133$ microseconds.

In other words, by using a system having two integration periods of 100 microseconds and 33 microseconds such that the second integration period is variable and dependent upon the throughput rate of the image processing system and contrasting this with a conventional synchronous scanners having a set or fixed scanline period of 190 microseconds, the present invention is still capable of reducing the scanline period ($T_{scanline}$) of a scanner by almost 30 percent and retain its synchronous operations.

Under the same assumption for the integration time, the $T_{scanline}$ value is calculated for an image document that is 8.5 inches in the fast-scan direction and is being scanned at 600 spots per inch and processed by an image processing system capable of processing 50 bytes or 50 pixels of image data per microsecond, $T_{scanline}=(8.5\times600)/50+T_{it}=103$ microseconds.

In other words, by using a system having two integration periods of 100 microseconds and 3 microseconds such that the second integration period is variable and dependent upon the throughput rate of the image processing system and contrasting this with a conventional synchronous scanners having a set or fixed scanline period of 190 microseconds, the present invention is still capable of reducing the scanline period ($T_{scanline}$) of a scanner by almost 46 percent and retain its synchronous operations.

In a last set of examples, it is assumed that the integration period of the CCD for the particularly designed synchronous scanner is 50 microseconds and the image processing circuit has a bandwidth of 75 MHz.

In the 11 inch fast-scan length case for 600 spi, $T_{scanline}=(11\times600)/75+T_{it}=89$ microseconds. In other words, by using a system having two integration periods of 50 microseconds and 39 microseconds such that the second integration period is variable and dependent upon the throughput rate of the image processing system and contrasting this with a conventional synchronous scanners having a set or fixed scanline period of 190 microseconds, the present invention is capable of reducing the scanline period ($T_{scanline}$) of a scanner by over 50 percent and retain its synchronous operations.

In the 8.5 inch fast-scan length case for 600 spi, $T_{scanline}=(8.5\times600)/75+T_{it}=69$ microseconds. In other words, by using a system having two integration periods of 50 microseconds and 19 microseconds such that the second integration period is variable and dependent upon the throughput rate of the image processing system and contrasting this with a conventional synchronous scanners having a set or fixed scanline period of 190 microseconds, the present invention is capable of reducing the scanline period ($T_{scanline}$) of a scanner by over 60 percent and retain its synchronous operations.

As shown through the examples discussed above, by having a variable dummy or garbage integration period in conjunction with the analog image unit's constant rated integration period to form the scanline period, a scanner can utilize a variable scanline period while maintaining a constant integration period and a synchronous scanning operation so as to capitalize on the increase efficiency of new photosensors (integration time periods less than 190 microseconds) and faster microprocessors and other circuitry. Moreover, in certain circumstances, the present invention can achieve optimal throughput notwithstanding the length of the fast-scan direction of an input document. This increase in productivity is realized by integrating the photosensor at its rated speed to generate a first scanline of valid image data and integrating the photosensor at a different interval which is equal to the difference between the time needed to image process a scanline of image data and the photosensor's rated integration period.

Although the present invention has been described with respect to a CCD sensor, the concepts are readily applicable to any photosensor apparatus such as a full width array or other device which converts light to electrical signals or other type or form which represents image data that can be processed by a machine.

While the invention has been described with reference to various embodiments disclosed above, it is not confined to the details set forth above, but is intended to cover such modifications or changes as may come within the scope of the attached claims.

What is claimed is:

1. A method for varying a scanline rate of a digital scanner while maintaining a constant integration period, comprising the steps of:

(a) scanning a scanline of an image;

(b) integrating an array of photosensors after a first predetermined period of time and integrating an array of photosensors after a second predetermined period of time have elapsed, one predetermined period of time being equal to the integration period of the array of photosensors and the other predetermined period of time being equal to a difference between a time needed to process a scanline of image data and the integration period of the array of photosensors;

(c) producing a scanline of valid image data and a scanline of image data corresponding to the scanline scanned in said step (a) from the two integrations of said step (b);

(d) scanning a new scanline of the image upon execution of said steps (a), (b), and (c);

(e) receiving information corresponding to a fast-scan length of the image being scanned;

(f) calculating the time needed for processing a scanline of image data from the information received in said step (e); and (g) calculating the predetermined period of time equal to a difference between a time needed to process a scanline of image data and the integration period of the array of photosensors according to the calculations performed in said step (f).

2. The method as claimed in claim 1, wherein the first predetermined period of time is equal to the integration period of the array of photosensors and the second predetermined period of time being equal to a difference between a time needed to process a scanline of image data and the integration period of the array of photosensors.

3. The method as claimed in claim 1, wherein the second predetermined period of time is equal to the integration period of the array of photosensors and the first predetermined period of time being equal to a difference between a time needed to process a scanline of image data and the integration period of the array of photosensors.

4. A method for varying a scanline rate of a digital scanner while maintaining a constant integration period, comprising the steps of:

(a) scanning a scanline of an image;

(b) integrating an array of photosensors after a first predetermined period of time and after a second predetermined period of time have elapsed, one predetermined period of time being equal to the integration period of the array of photosensors and the other predetermined period of time being equal to a difference between a time needed to process a scanline of image data and the integration period of the array of photosensors;

(c) producing a scanline of valid image data and a scanline of image data corresponding to the scanline scanned in said step (a) from the two integrations of said step (b);

(d) scanning a new scanline of the image upon execution of said steps (a), (b), and (c);

(e) receiving information corresponding to a fast-scan length of the image being scanned;

(f) receiving information corresponding to a fast-scan resolution;

(g) calculating the time needed for processing a scanline of image data from the information received in said steps (e) and (f); and (h) calculating the predetermined period of time being equal to a difference between a time needed to process a scanline of image data and the integration period of the array of photosensors according to the calculations performed in said step (g).

5. A system for varying a scanline rate of a digital scanner while maintaining a constant integration period, comprising:

photosensitive means for converting light reflected from a first scanline of an image into image signals;

controller means for producing integration signals to control an integration of said photosensitive means; and said controller means producing a first integration signal after a first predetermined period has elapsed and producing a second integration signal after a second predetermined period has elapsed, one predetermined period of time being equal to the integration period of the array of photosensors and the other predetermined period of time being equal to a difference between a time needed to process a scanline of image data and the integration period of the array of photosensors;

said photosensitive means producing a first scanline of valid image data in response to said first integration signal and producing a second scanline of image data in response to said second integration signal;

registration guide means for generating information corresponding to a fast-scan length of the image being scanned;

said controller means calculating the time needed for processing a scanline of image data according to the information generated by said length means.

6. The system as claimed in claim 5, wherein said first predetermined period of time is equal to the integration period of the array of photosensors and said second predetermined period of time being equal to a difference between a time needed to process a scanline of image data and the integration period of the array of photosensors.

7. The system as claimed in claim 5, wherein said second predetermined period of time is equal to the integration period of the array of photosensors and said first predetermined period of time being equal to a difference between a time needed to process a scanline of image data and the integration period of the array of photosensors.

8. The system as claimed in claim 5, wherein said photosensitive means is a full width array.

9. The system as claimed in claim 5, wherein said photosensitive means is a CCD sensor.

10. A system for varying a scanline rate of a digital scanner while maintaining a constant integration period, comprising:

photosensitive means for converting light reflected from a first scanline of an image into image signals;

controller means for producing integration signals to control an integration of said photosensitive means;

said controller means producing a first integration signal after a first predetermined period has elapsed and producing a second integration signal after a second predetermined period has elapsed, one predetermined period of time being equal to the integration period of the array of photosensors and the other predetermined period of time being equal to a difference between a time needed to process a scanline of image data and the integration period of the array of photosensors;

said photosensitive means producing a first scanline of valid image data in response to said first integration signal and producing a second scanline of image data in response to said second integration signal;

means for generating information corresponding to a fast-scan length of the image being scanned; and input means for inputting information corresponding to a fast-scan resolution;

said controller means calculating the time needed for processing a scanline of image data and the second predetermined period of time according to the fast-scan length and fast-scan resolution.

11. The system as claimed in claim 10, wherein said length means generates said fast-scan length information from a pre-scan of the image.

12. The system as claimed in claim 10, wherein input means is a user interface.

13. The system as claimed in claim 10, wherein said length means generates said fast-scan length information from positions of registration edges on a document handler.

* * * * *